(12) United States Patent
Yuan et al.

(10) Patent No.: US 11,948,016 B2
(45) Date of Patent: Apr. 2, 2024

(54) APPLICATION PROGRAMMING INTERFACE MANAGEMENT

(71) Applicant: International Business Machines Corporation, Armonk, NY (US)

(72) Inventors: Yun Fei Yuan, Beijing (CN); Qun Pan, Shanghai (CN); Zhun Huang, Beijing (CN); Xiang Juan Meng, Beijing (CN); Cheng Fang Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 17/324,649

(22) Filed: May 19, 2021

(65) Prior Publication Data

US 2022/0374289 A1 Nov. 24, 2022

(51) Int. Cl.
*G06F 9/54* (2006.01)
(52) U.S. Cl.
CPC .................... *G06F 9/541* (2013.01)
(58) Field of Classification Search
CPC .................................................. G06F 9/541
See application file for complete search history.

(56) References Cited

U.S. PATENT DOCUMENTS

| | | | |
|---|---|---|---|
| 6,253,257 B1 | 6/2001 | Dundon | |
| 8,782,744 B1* | 7/2014 | Fuller | G06F 21/629 |
| | | | 709/225 |
| 11,228,573 B1* | 1/2022 | Rangasamy | H04L 12/40006 |
| 2012/0064503 A1* | 3/2012 | Helton | G09F 7/04 |
| | | | 434/408 |
| 2014/0244708 A1 | 8/2014 | Taine | |
| 2015/0304306 A1* | 10/2015 | Ponsford | H04L 63/045 |
| | | | 713/193 |
| 2016/0218830 A1* | 7/2016 | Martinez | H04L 1/0045 |
| 2017/0064038 A1* | 3/2017 | Chen | H04W 12/08 |
| 2017/0359400 A1* | 12/2017 | Demulder | G06F 8/66 |
| 2018/0107479 A1 | 4/2018 | Duppenthaler | |
| 2019/0129773 A1* | 5/2019 | Suter | G06F 11/3612 |
| 2019/0384650 A1 | 12/2019 | Danielsson | |
| 2020/0050446 A1 | 2/2020 | Li | |
| 2020/0226185 A1 | 7/2020 | Yan | |
| 2022/0051181 A1* | 2/2022 | Yacoub | G06Q 10/0833 |
| 2022/0217153 A1* | 7/2022 | Krishnan | H04L 63/108 |

OTHER PUBLICATIONS

Stack, "Retrying Downloader Middleware for failed requests in scrapy", pp. 1-3, Jul. 21, 2022 (Year: 2022).*
"Schema Evolution and Compatibility", Confluent, Downloaded from the Internet on Apr. 23, 2021, 9 pgs., © Copyright 2021, Confluent, Inc., <https://docs.confluent.io/platform/current/schema-registry/avro.html>.

* cited by examiner

Primary Examiner — Kevin L Young
Assistant Examiner — Phuong N Hoang
(74) Attorney, Agent, or Firm — Kristofer Haggerty

(57) ABSTRACT

Embodiments of the present invention relate to a method, system and computer program product for application programming interface (API) management. According to the method, in response to a first response from an API provider indicating a failure of a first API request initiated by an API requestor, a second API request is generated at least based on the first API request. The second API request is transmitted to the API provider. A second response to the second API request is received from the API provider. A third response is provided to the API requestor based on the second response.

17 Claims, 7 Drawing Sheets

APPLICATION PROGRAMMING INTERFACE MANAGEMENT

BACKGROUND

The present invention generally relates to computer techniques and more particularly, to a method, system, and computer program product for application programming interface (API) management.

In computing, an API is an interface that defines interactions between multiple software applications or mixed hardware-software intermediaries. It defines the kinds of calls or requests that can be made, how to make them, the data formats that should be used, the conventions to follow, etc. It can also provide extension mechanisms so that users can extend existing functionality in various ways and to varying degrees. An API can be entirely custom, specific to a component, or designed based on an industry-standard to ensure interoperability. APIs can enable arbitrary operations on computers, for example, accessing data through or creating user accounts.

SUMMARY

According to one embodiment of the present invention, there is provided a computer-implemented method. According to the method, in response to a first response from an application programming interface (API) provider indicating a failure of a first API request initiated by an API requestor, a second API request is generated at least based on the first API request. The second API request is transmitted to the API provider. A second response to the second API request is received from the API provider. A third response is provided to the API requestor based on the second response.

According to a further embodiment of the present invention, there is provided a system. The system comprises a processing unit; and a memory coupled to the processing unit and storing instructions thereon. The instructions, when executed by the processing unit, perform acts of the above method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the above method according to the embodiment of the present invention.

BRIEF DESCRIPTION OF THE SEVERAL VIEWS OF THE DRAWINGS

Through the more detailed description of some embodiments of the present invention in the accompanying drawings, the above and other objects, features and advantages of the present invention will become more apparent, wherein the same reference generally refers to the same components in the embodiments of the present invention.

DETAILED DESCRIPTION

Figure 1:
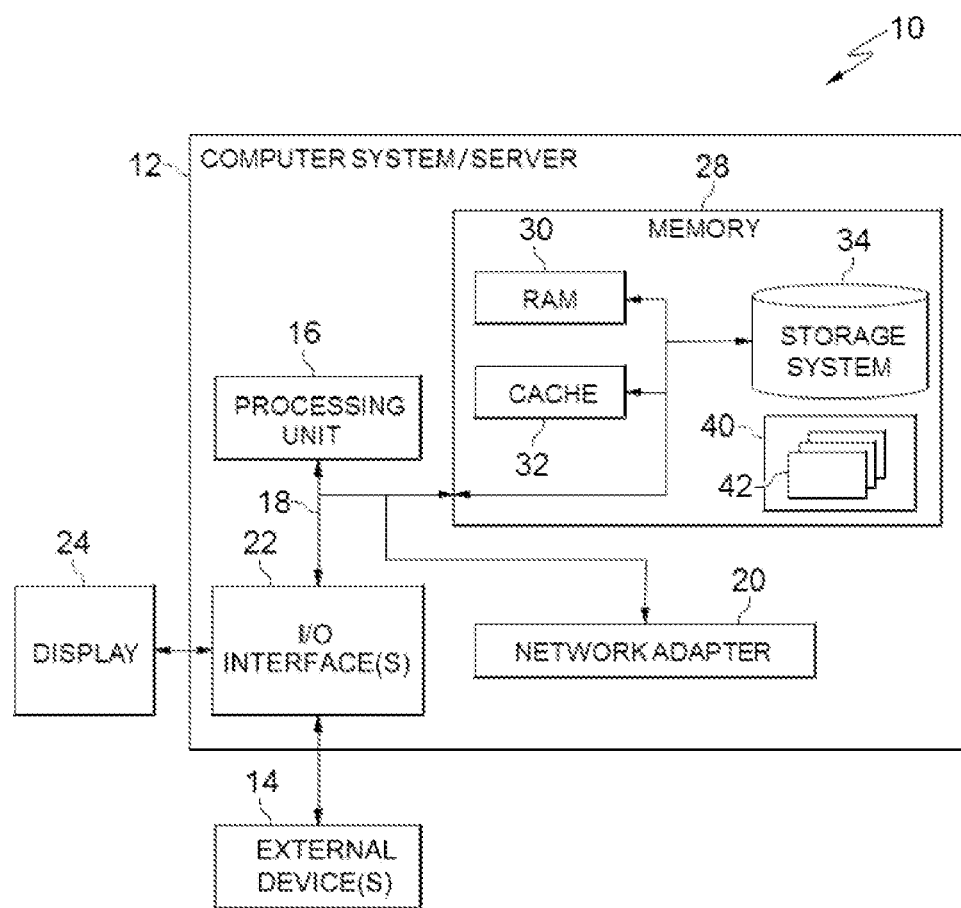
FIG. 1 depicts a cloud computing node in accordance with some embodiments of the present invention.

Some embodiments will be described in more detail with reference to the accompanying drawings, in which the embodiments of the present invention have been illustrated. However, the present invention can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the present invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processor(s) 16 (including one or more computer processors), a system memory 28, and a bus 18 that couples various system components including system memory 28 to processor(s) 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
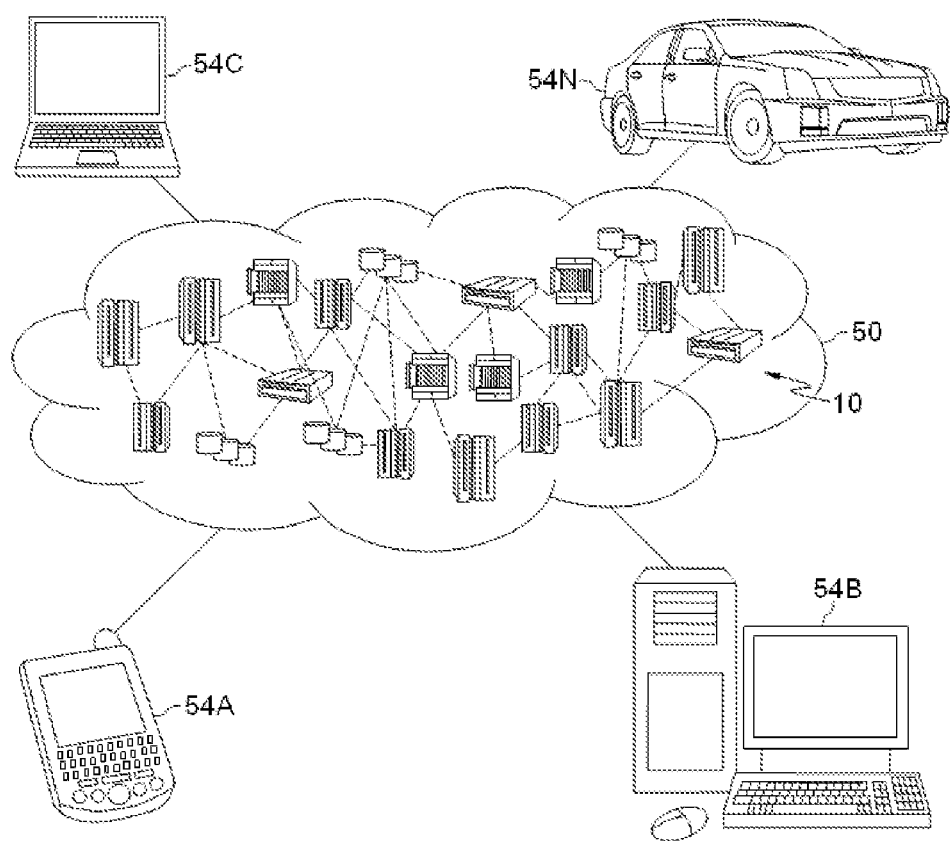
FIG. 2 depicts a cloud computing environment in accordance with some embodiments of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
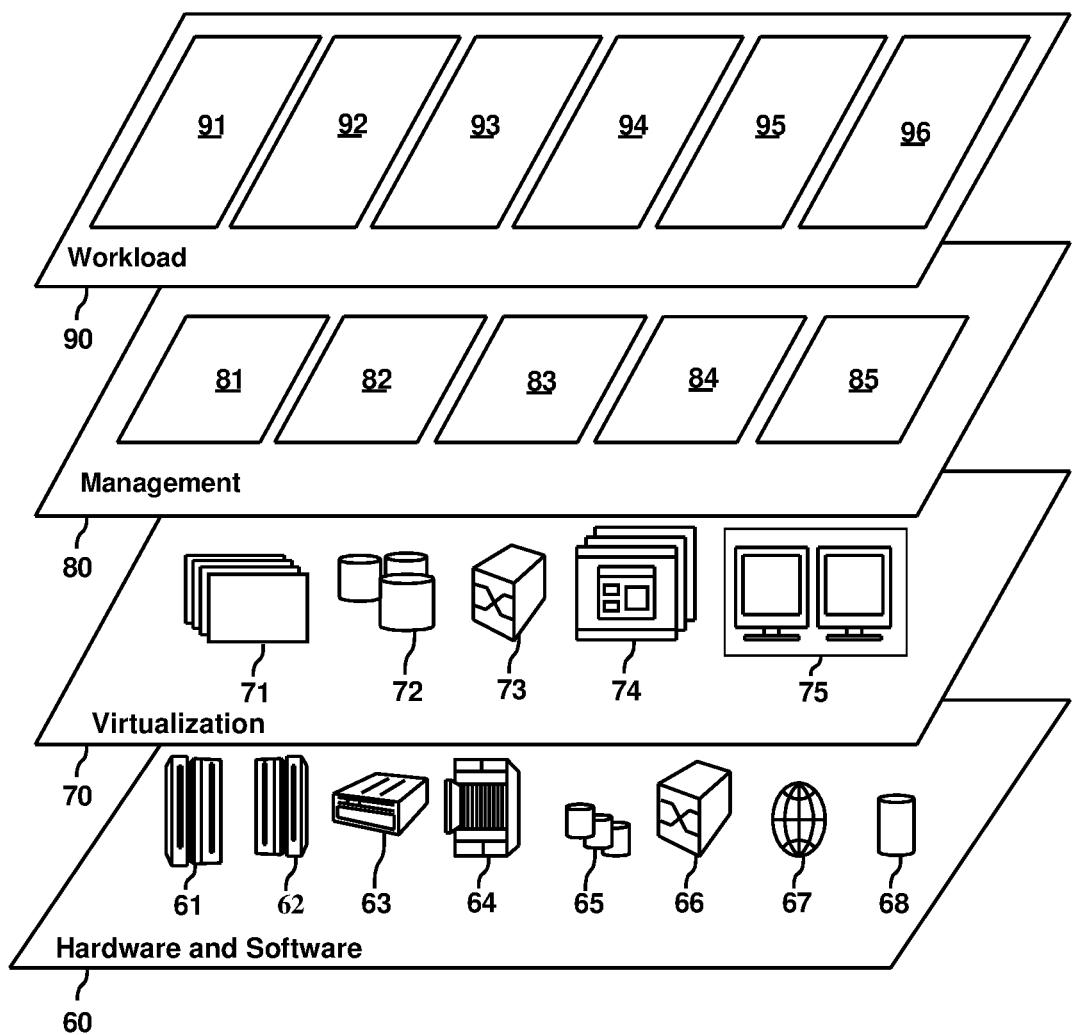
FIG. 3 depicts abstraction model layers in accordance with some embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and API management 96. The functionalities of API management 96 will be described in the following embodiment of the present invention.

A variety of services are developed to request APIs provided by API providers to execute corresponding operations. Sometimes, an API provider may update an API to a new version which will affect the format of API request. In some cases, an API requestor such as a service may not be effectively aware of the new version of the API and thus may be unable to generate an appropriate API request. This will cause service failure, which is intolerant for users.

Conventionally, the API requestor or the developer of the API requestor may subscribe to an API service corresponding to the API so that it may obtain a notification when the API provider makes the change. However, there may be a delay for technical reaction because the API requestor may be manually configured in order to initiate correct API requests to the API provider. A service discontinuity and inconsistency may occur due to the delay, which is undesirable.

Therefore, in view of the shortcomings and problems with conventional approaches, there is a need for API management to keep service continuity and consistency in the case of API changes.

According to example embodiments of the present invention, there is proposed an improved solution for API management. In this solution, a response to an API request is monitored from an API provider. If a failure in the response is detected, instead of directly providing an API requestor with the response indicating the failure, a new API request is generated and provided to the API provider. A further response to the new API request is received from the API provider and used to determine a response to be provided the API requestor.

Through the solution, an API management system is provided as a consistent interface disposed between the API requestor and the API provider, which can filter out failed API requests and generate new API requests to attempt to successful responses. As such, it is possible to keep service continuity and consistency when the API provider changes the API.

Other advantages of the present invention will be described with reference to the example embodiments and the accompanying drawings below.

Figure 4:
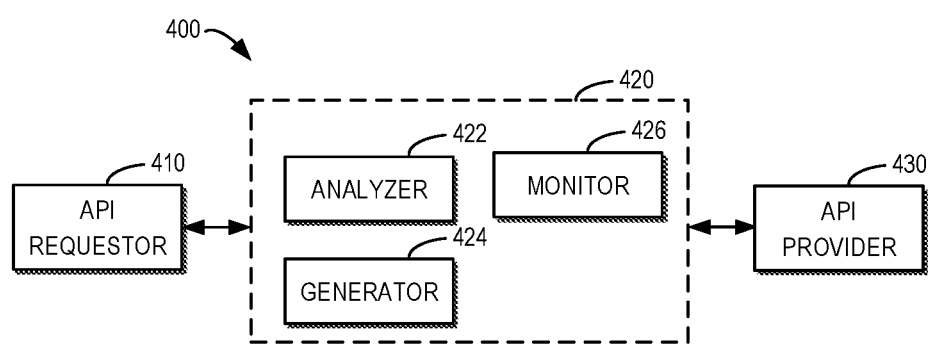
FIG. 4 depicts a block diagram of an example environment in accordance with some embodiments of the present invention.

Reference is now made to FIG. 4, which depicts a block diagram of an example environment 400 in accordance with some embodiments of the present invention.

As illustrated in FIG. 4, an API requestor 410 is configured to generate or initiate an API request to an API provider 430. The API requestor 410 may request an API (which may be provisioned as an API service) provided by the API provider 430 to request an operation(s) executed by the API. Examples of the operations may include, but are not limited to, accessing data, creating user accounts, and/or taking other actions.

The API requestor 410 may be a service, an application, a device, a user, a business entity, and/or any other entity that may need to request an API to carry out its operation(s) during operation. In some cases, the API requestor 410 may also be referred to as an API consumer.

The API provider 430 may provide one or more APIs which may be provisioned as one or more API services that can be requested. The API provider 430 may update the API to a new version which will affect the format of API request. In such case, if the API provider 430 receives an API request generated according to the older version of the API, it may not provide the expected response to the API request. In such a case, the API request may be considered as failed.

In accordance with embodiments of the present invention, an API management system 420 is disposed between the API requestor 410 and the API provider 430 to help the API requestor 410 to obtain a successful API response when the API is changed. The API management system 420 may be considered as a consistent interface between the API requestor 410 and the API provider 430, allowing API service continuity and consistency. As illustrated, in some embodiments, the API management system 420 may comprise an analyzer 422, a generator 424, and a monitor 426 to carry out respective operations related to API management. In the following, reference will be made to FIG. 5 to discuss an example signaling flow between the API requestor 410, the API management system 420, and the API provider 430 in accordance with some embodiments of the present invention.

It should be appreciated that for the purpose of illustration, in the example of FIG. 4, one API requestor 410 and one service provider 430 are illustrated in the environment 400. It should be appreciated that the API management system 420 may be configured to provide a consistent interface for more than one API requestor and more than one service provider.

In some embodiments, the API management system 420 may be implemented by one or more computing systems or devices having computing and storage capability. For example, the API management system 420 may be implemented by one or more computing platforms, servers, mainframes, general-purpose computing devices, and/or the like.

It should also be appreciated that the components of the API management system 420 shown in FIG. 4 may be implemented as one or more software engines, modules, or the like, which are configured with logic for implementing the functionality attributed to the particular module. Each component may be implemented using one or more of such software engines, modules, or the like. The software engines, modules, and the like are executed on one or more processors of one or more computing systems or devices and utilize or operate on data stored in one or more storage devices, memories, or the like, on one or more of the computing systems.

Figure 5:
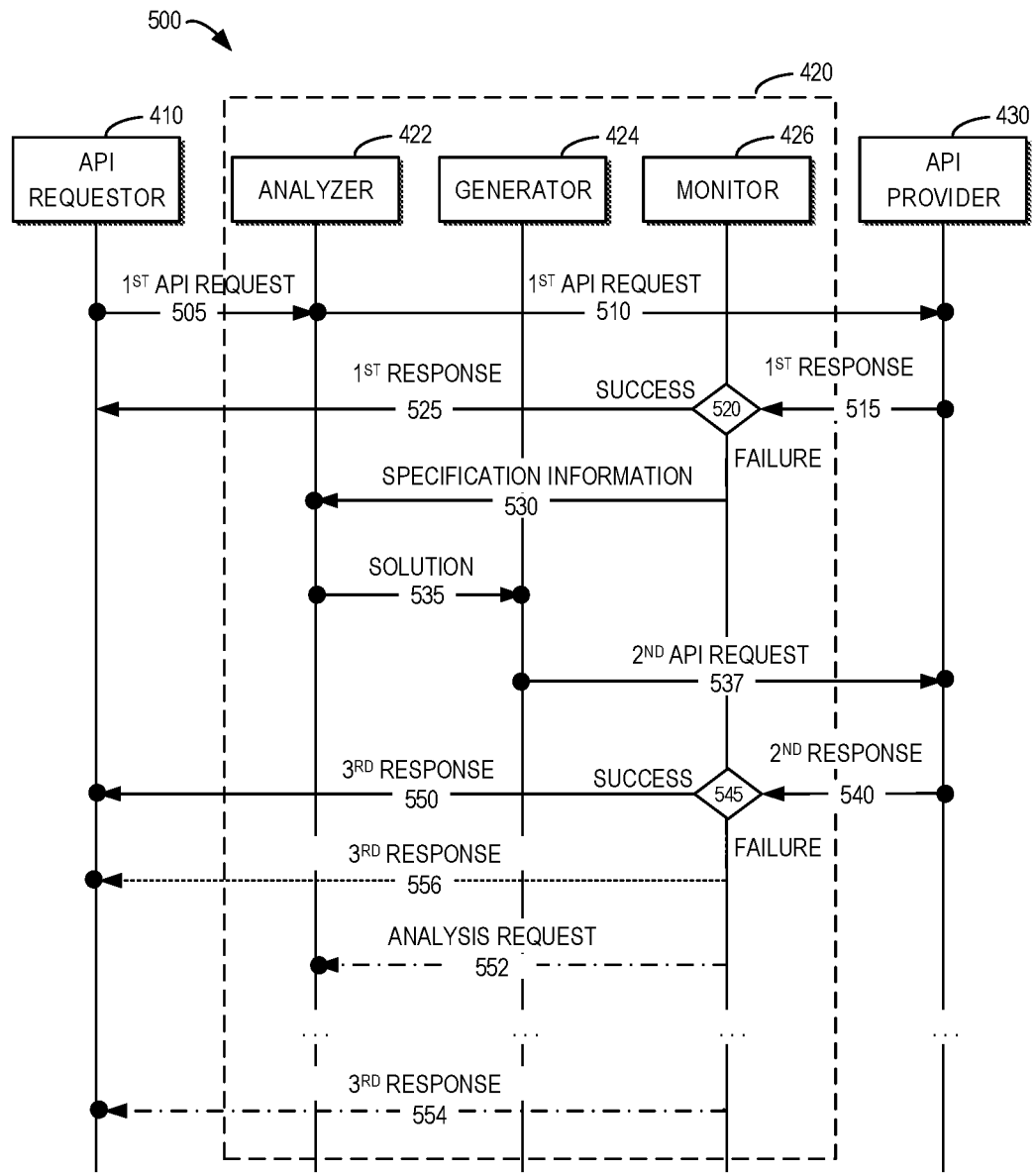
FIG. 5 depicts a sequence diagram of an example signaling flow in accordance with some embodiments of the present invention.

FIG. 5 depicts a sequence diagram of an example signaling flow 500 in accordance with some embodiments of the present invention. The signaling flow 500 involves the API requestor 410, the API management system 420, and the API provider 430.

The API requestor 410 generates an API request (referred to as a first API request for purpose of discussion) to the API provider 430 (not shown). The first API request may be generated by the API requestor 410 according to specification information regarding a format of an API request to the requested API provided at the API provider 430. In some examples, the specification information may specify a format of an API request, for example, one or more fields (or parameters) to be included in an API request. The API requestor 410 may generate the first API request to include the one or more specified fields and populate corresponding values into the specified fields.

Figure 6A:
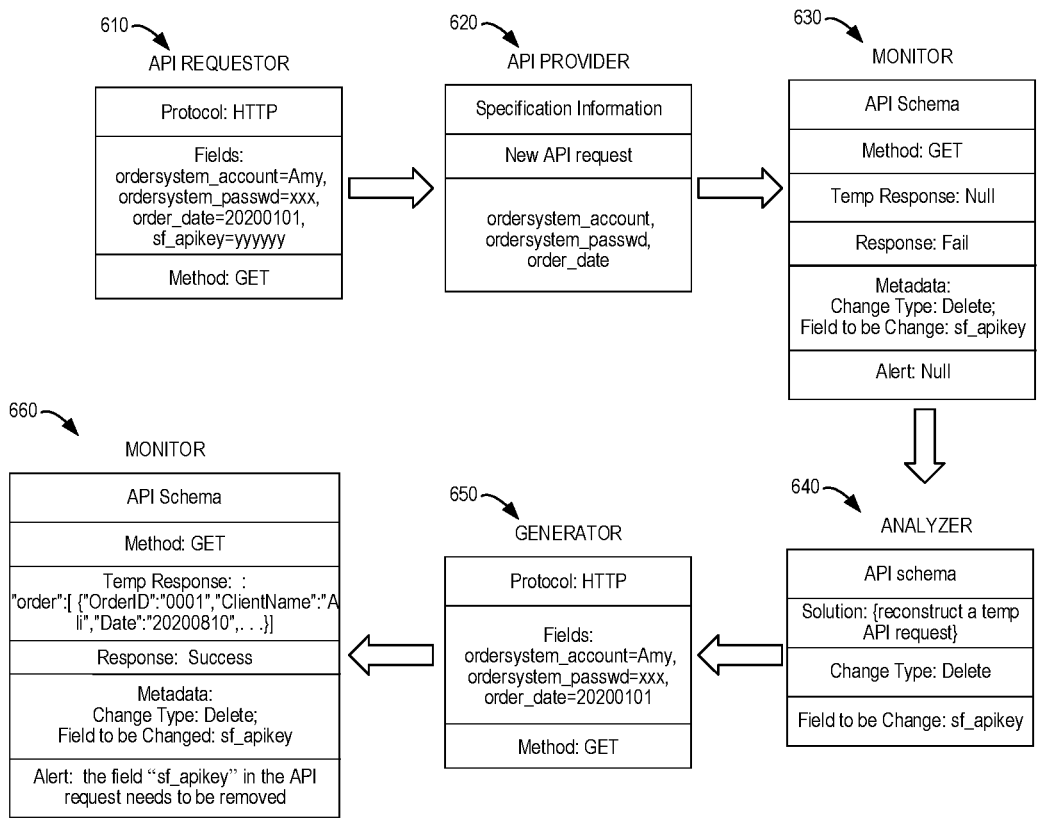
FIGS. 6A-6C depict some examples of requests/responses/intermediate information in accordance with some embodiments of the present invention.

FIG. 6A illustrates an example of requests/responses/intermediate information in accordance with some embodiments of the present invention. An example of the first API request 610 generated by the API requestor is illustrated. In this example, the first API request 610 is a getOrder request to request the API to read out order information. As illustrated, the first API request 610 includes fields of "ordersystem_account," "ordersystem_password," "order_date," and "sf_apikey," each of which is populated with a corresponding value. The first API request 610 further includes a field of "protocol" to indicate a networking protocol, and a field of "method" to indicate the type of the first API request, each of which is also populated with corresponding value.

In some embodiments, the API requestor 410 may transmit 505 the first API request to the API management system 420. For example, the first API request may be provided to the analyzer 422 of the API management system 420. The analyzer 422 may record the first API request for following use and forward 510 the first API request to the API provider 430. In such a case, API requests and responses to the API requests (as will be described below) are monitored by the API management system 420. In some embodiments, the API requestor 410 may directly transmit the first API request to both the API provider 430 and the API management system 420.

Upon reception of the first API request, the API provider 430 generates a response to the first API request (referred to as a first response for purpose of discussion) and transmits 515 the first response to the API management system 420. For example, the monitor 426 of the API management system 420 may monitor the first response to the first API request. The monitor 426 is configured to keep track of responses to API requests from the API provider 430 and filter out candidate API requests that need to involve the analyzer 422 and generator 424 for further processing.

Specifically, the monitor 426 of the API management system 420 determines 520 whether the first response from the API provider 430 indicates a failure or success of the first API request. Since the API provider 430 may change its API, the first response may indicate a failure or success of the first API request depending on whether the first API request is compatible with the new version of API that is currently provided at the API provider 430.

In some embodiments, if the monitor 426 determines that the first response indicates the success of the first API request, it means that the first response may carry expected information to the first API request. In such a case, the API management system 420 (e.g., the monitor 426) may forward 525 the first response to the API requestor 410.

In some embodiments, due to the change of the API, the monitor 426 determines that the first response indicates a failure of the first API request. In such a case, the API management system 420 generates a new API request (referred to as a second API request for purpose of discussion) by its own to attempt to obtain a correct API response for the API requestor. The second API request is generated from the first API request based on specification information detected from the first response. In some examples, the API management system 420 may have authorization from the API requestor 410 to generate new API requests for the failed API requests.

In some embodiments, the monitor 426 may obtain, from the API provider 430, specification information specifying a change to the first API request. The specification information may specify one or more change types of one or more fields in the first API request. In some embodiments, the specification information may include a swagger file specifying a format of a new API request for the requested API. In an embodiment, the monitor 426 may request the API provider 430 to provide the specification information in the case that the failure of the first API request is detected. In another embodiment, the monitor 426 may subscribe to the API provider 430 about any update of the API. The API provider 430 may automatically provide the specification information to the monitor 426. In some examples, the specification information may be provided to the monitor 426 together with the first response.

It is noted that although the API requestor may be able to obtain the specification information about the API change in conventional solutions, the API requestor 410 may not be automatically reconfigured to generate the specified new API requests because manual configuration is usually required. Generally, any reconfiguration of the API requestor 410 may result in a delay and thus service discontinuity is unavoidable. In accordance with the embodiments of the present invention, the API request(s) from the API requestor 410 that is currently processed can still be processed to obtain a corrected API request(s), without incurring any discontinuity and inconsistency.

In some embodiments as illustrated in FIG. 5, the monitor 426 may provide 530 the specification information to the analyzer 422. The analyzer 422 may be configured to suggest a solution for the generator 424 to generate the second API request based on the recorded first API request and the specification information. The generation of the second API request may depend on how the API is changed. Some examples will be discussed in detail below.

In the example of FIG. 6A, the specification information in example first response 620 obtained from the API provider 430 indicates that the format of the API request includes fields of "ordersystem_account," "ordersystem_password," and "order_date." As compared with the fields detected in the example first API request 610, the monitor 426 may determine that the field of "sf_apikey" is deleted. The monitor 426 may generate information 630 to be transmitted to the analyzer 422, which indicates that a change type is "Delete" and a field to be changed is "sf_apikey."

In some embodiments, the information 630 may include an API schema which may be generated by merging metadata with the first response. The metadata may indicate the change type of "Delete" and the field to be changed "sf_apikey." The example first response 620 may include a field of "method" to indicate the type of the first API request, a field of "temp response" which is null because of the failure of the first API request, a field of "response" to indicate the failure of the first API request, and a field of "alert" for inserting any alert information.

To generate the solution for the generator 424 to generate the second API request, the analyzer 422 may generate information 640 as illustrated in FIG. 6A based on the specification information. The information 640 may include an API schema which indicates a field of "solution" to indicate that a temporary request can be reconstructed based on the specification information, the change type of "Delete" and the field to be changed "sf_apikey."

Reference is made back to FIG. 5, where the analyzer 422 may provide 535 the solution to the generator 424. The generator 424 may generate the second API request based on the solution obtained from the analyzer 422 and provide 537 the second API request to the API provider 430. For example, in the example of FIG. 6A, the solution from the analyzer 422 indicate that a field of the first API request (e.g., "sf_apikey") is to be deleted. Thus, the generator 424 may generate the second API request by deleting the field (e.g., "sf_apikey") from the first API request. An example second API request 650 is illustrated in FIG. 6A. As compared with the example first API request 610, the field of "sf_apikey" is removed from the second API request.

Figure 6B:
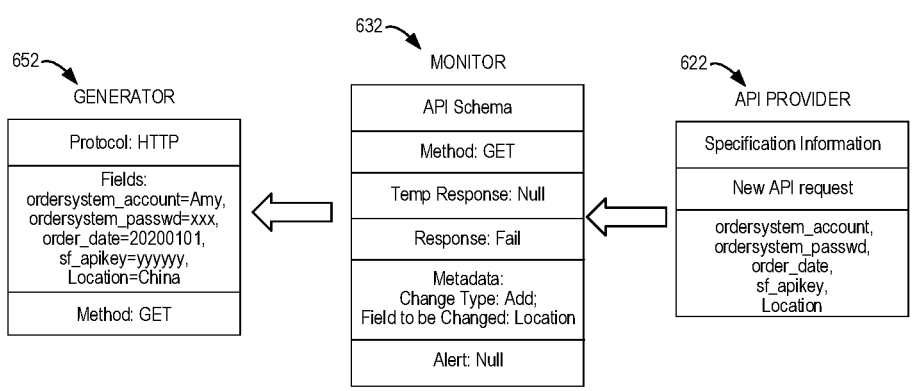
Figure 6C:
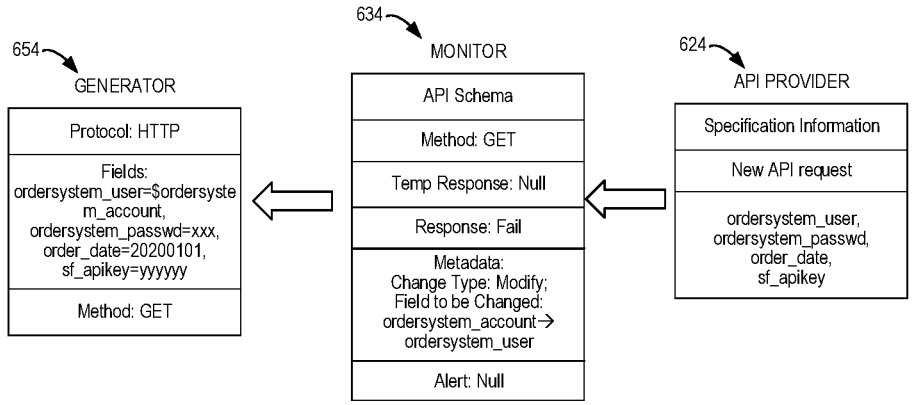

The example of deletion of a field from the first API request is illustrated in FIG. 6A. In some embodiments, as an alternative or additionally, the specification information may indicate one or more fields to be changed in the first API request. FIG. 6B and FIG. 6C illustrate some further examples.

In the example of FIG. 6B, example specification information 622 obtained from the API provider 430 indicates that the format of the API request includes fields of "ordersystem_account," "ordersystem_password," "order_date," "sf_apikey," and "location." As compared with the fields detected in the example first API request 610, the monitor 426 may determine that an additional field of "location" is added. Thus, the analyzer 422 may generate information to indicate that a change type is "Add" and a field to be changed is "location."

With the information received from the monitor 426, the analyzer 422 may generate corresponding information 632 to indicate a solution of adding the field of "location" into the first API request, as illustrated in FIG. 6B. In some embodiments, in addition to suggesting addition of the field of "location," the analyzer 422 may further determine a value to be populated into the added field. In some embodiments, the analyzer 422 may analyze contextual information about historical API requests to which successful responses were received as well as the responses, so as to suggest a possible value to be inserted into the added field. In some embodiments, the analyzer 422 may determine a default value for the added field. For example, for the added field of "location," the analyzer 422 may determine, for example, from historical API requests and their responses, that the first API request may possibly be related to "China" and thus may suggest the generator 424 to populate "China" as a default value for the added field of "location." The analyzer 422 may determine a value for the added field according to various other manners, which is not limited herein.

According to the solution from the analyzer 422, the generator 424 may generate an example second API request 652 as illustrated in FIG. 6B. As compared with the example first API request 610, the example second API request 652 includes an additional field of "location" which is populated with "China."

In the example of FIG. 6C, example specification information 624 obtained from the API provider 430 indicates that the format of the API request includes fields of "ordersystem_user," "ordersystem_password," "order_date," and "sf_apikey." As compared with the fields detected in the example first API request 610, the monitor 426 may determine that the field of "ordersystem_account" is modified to a field of "ordersystem_user." Thus, the analyzer 422 may generate information to indicate that a change type is "Modify" and a field to be changed is to modify the field of "ordersystem_account" to be "ordersystem_user."

With the information received from the monitor 426, the analyzer 422 may generate corresponding information 634 to indicate a solution of modifying the field of "ordersystem_account" to be "ordersystem_user," as illustrated in FIG. 6C. In some embodiments, in addition to suggesting modification of the field in the first API request, the analyzer 422 may further determine a value to be populated into the modified field (e.g., "ordersystem_user"), as discussed above. For example, for the modified field of "ordersystem_user," the analyzer 422 may determine, for example, from historical API requests and their responses, that the value to be populated in the field of "ordersystem_user" may be the same as that populated in the field of "ordersystem_ account." Thus, the analyzer 422 may indicate in the solution provided to the generator 424 that the field of "ordersystem_user" may make a reference to the value in the field of "ordersystem_account."

According to the solution from the analyzer 422, the generator 424 may generate an example second API request 654 as illustrated in FIG. 6C. In the second API request 654, the field of "ordersystem_user" is included, whose value is made a reference to the previous field of "ordersystem_account."

Reference is made back to FIG. 5, in the signaling flow 500, the API provider 430 receives the second API request and generates a response (referred to as a "second response") to the second API request. The API provider 430 provides 540 the second response to the API management system 420, e.g., to the monitor 426. Upon reception of the second response from the API provider 430, the API management system 420 provides a response (sometimes referred to as a "third response" for purpose of discussion) to the API requestor 410 based on the second response.

Specifically, the monitor 426 of the API management system 420 may determine 545 whether the second response from the API provider 430 indicates a failure or success of the second API request. In some embodiments, if the monitor 426 determines that the second response indicates the success of the second API request, the monitor 426 may provide 550 a third response to the API requestor 410, which includes the second response.

In some embodiments, if the second response received from the API provider 430 indicates success of the second API request, the monitor 426 may modify the second response by adding alert information indicating a change in generating the first API request and transmit the modified second response to the API requestor 410 as the third response. By including the alert information into the response, the API requestor 410 may be alerted to the API change and thus the reconfiguration of the API requestor 410 may be initiated quickly.

FIG. 6A further illustrates an example second response 660 indicating success of the second API request 650. The example second response 660 may include a field of "method" to indicate the type of the first API request, a field of "temp response" which include response information provided by the API provider 430, a field of "response" to indicate the success of the second API request. The example second response 660 is modified by adding alert information to indicate metadata in the information 630, which indicates that a change type is "Delete" and a field to be changed is "sf_apikey." The example second response 660 is modified by adding alert information to alert the change in the field of "alert." The alert information may be similarly added in the examples of FIG. 6B and FIG. 6C.

In some embodiments, if the value(s) populated into the added field(s) or modified field(s) is inappropriate, the API management system 420 may not be able to obtain a correct response from the API provider 430. Thus, the monitor 426 may detect a failure of the second API request. In response to the failure of the second API request, the API management system 420 may generate a further API request (referred to as a "third API request" for purpose of discussion) based on the first API request and the specification information indicating the change.

For example, the monitor 426 may provide 552 an analysis request to the analyzer 422 to generate a further solution for generating the third API request. The monitor 426, the analyzer 422, and the generator 424 may interact with each other in a similar way as discussed above to generate the third API request. At this time, one or more new values may be determined and populated into the added field(s) or modified field(s). Similarly, to the second API request, the API management system 420 may transmit the third API request to the API provider 430 and receive a fourth response to the third API request from the API provider 430. The API management system 420 may further determine the third response to be provided to the API requestor 410 based on the response to the third API request and provide 554 the determined third response to the API requestor 410.

In some embodiments, if the API management system 420 has tried a number of times to generate new API requests but still obtain responses indicating failure from the API provider 430, the monitor 426 may provide 556 the current response (e.g., the second response) indicating a failure of the API request to the API requestor 410 to the API requestor 410 as a third response. The API management system 420 may be configured with a maximum number of attempt times and may stop after the maximum number of attempts.

It should be appreciated that although the internal operations among the analyzer 422, the generator 424, and the monitor 426 in the API management system 420 are described above, one or more of the operations performed at one of the those components may also be performed at the other component. In some examples, one or more of the operations performed by those components may be omitted or modified if the functionalities of those components are changed. The scope of the present invention is not limited in this regard.

It should also be appreciated that the example requests/ responses/intermediate information in FIGS. 6A-6C are illustrated for purpose of discussion only, without suggesting any limitation to the scope of the present invention. For example, although one field is illustrated in each of the examples as being deleted, added, or modified, in some other examples, more than one field of the first API request may be deleted, added, or modified depending of the API change made by the API provider.

Figure 7:
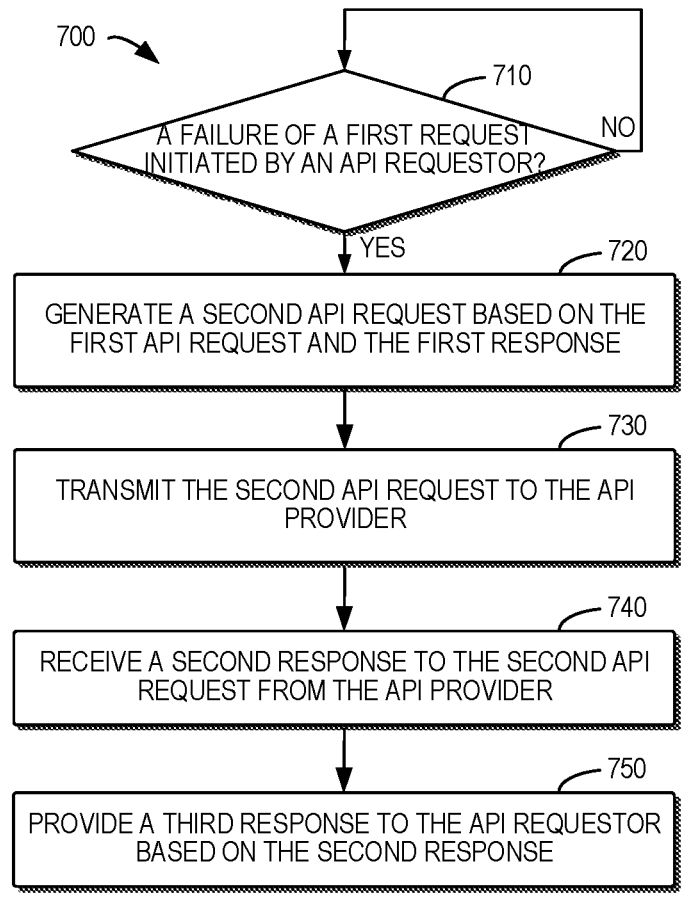
FIG. 7 depicts a flowchart of an example method in accordance with some embodiments of the present invention.

FIG. 7 shows a flowchart of an example method 700 in accordance with some embodiments of the present invention. The method 700 can be implemented in the API management system 420 as shown in FIG. 4. For the purpose of discussion, the method 700 will be described with reference to FIG. 4.

At block 710, the API management system 420 determines whether a first response from the API provider 430 indicates a failure of a first API request initiated by the API requestor 410. The API management system 420 may continually monitor responses to API requests of the API requestor 410. If the first response indicates a failure of the first API request, at block 720, the API management system 420 generates a second API request at least based on the first API request. At block 730, the API management system 420 transmits the second API request to the API provider 430. At block 740, the API management system 420 receives a second response to the second API request from the API provider 430. At block 750, the API management system 420 provides a third response to the API requestor 410 based on the second response.

In some embodiments, to generate the second API request, the API management system 420 may obtain specification information from the API provider 430, the specification information specifying a change to the first API request; and generate the second API request based on the first API request and the specification information.

In some embodiments, to generate the second API request based on the first API request and the specification information, the API management system 420 may, in accordance with a determination that the specification information specifies deletion of a first field from the first API request, generate the second API request by deleting the first field from the first API request.

In some embodiments, to generate the second API request based on the first API request and the specification information, the API management system 420 may, in accordance with a determination that the specification information specifies addition of a second field into the first API request, generate the second API request by adding the second field into the first API request and populating the second field with a first value.

In some embodiments, to generate the second API request based on the first API request and the specification information, the API management system 420 may, in accordance with a determination that the specification information specifies a modification of a third field of the first API request into a fourth field, generate the second API request by modifying the third field of the first API request into the fourth field and populating the fourth field with a second value.

In some embodiments, to provide the third response to the API requestor 410 based on the second response, the API management system 420 may, in accordance with a determination that the second response indicates success of the second API request, transmit the second response to the API requestor 410 as the third response; and in accordance with a determination that the second response indicates a failure of the second API request, generate a third API request at least based on the first API request, transmit the third API request to the API provider 430, receive a fourth response to the third API request from the API provider 430, and provide the third response to the API requestor 410 based on the fourth response.

In some embodiments, to transmit the second response to the API requestor 410, the API management system 420 may modify the second response by adding alert information indicating a change to the first API request; and transmit the modified second response to the API requestor 410 as the third response.

In some embodiments, the API management system 420 may further receive the first API request from the API requestor 410, record the first API request with respect to the API requestor 410; and forward the first API request to the API provider 430.

It should be noted that the processing of API management or the API management system 420 according to embodiments of this invention could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
responsive to a first response from an application programming interface (API) provider indicating a failure of a first API request initiated by an API requestor, generating, by one or more processors, a second API request at least based on the first API request and a specification information from the API provider specifying a change to the first API request;
responsive to determining that the specification information specifies addition of a second field into the first API request:
determining a first value of the second field; and
including within the second API request the second field and populating the second field with the first value;
transmitting, by the one or more processors, the second API request to the API provider;
receiving, by the one or more processors, a second response to the second API request from the API provider; and
providing, by the one or more processors, a third response to the API requestor based on the second response.

2. The method of claim 1, wherein generating the second API request comprises:
obtaining, by the one or more processors, a specification information from the API provider, the specification information specifying a change to the first API request.

3. The method of claim 1, wherein generating the second API request based on the first API request and the specification information comprises:
responsive to a determination that the specification information specifies deletion of a first field from the first API request, generating, by the one or more processors, the second API request by deleting the first field from the first API request.

4. The method of claim 1, wherein generating the second API request based on the first API request and the specification information comprises:
responsive to a determination that the specification information specifies a modification of a third field of the first API request into a fourth field, generating, by the one or more processors, the second API request by modifying the third field of the first API request into the fourth field and populating the fourth field with a second value.

5. The method of claim 1, wherein providing the third response to the API requestor based on the second response comprises:
responsive to a determination that the second response indicates success of the second API request, transmitting, by the one or more processors, the second response to the API requestor as the third response; and
responsive to a determination that the second response indicates a failure of the second API request,
generating, by the one or more processors, a third API request at least based on the first API request,
transmitting, by the one or more processors, the third API request to the API provider,
receiving, by the one or more processors, a fourth response to the third API request from the API provider, and
providing, by the one or more processors, the third response to the API requestor based on the fourth response.

6. The method of claim 5, wherein transmitting the second response to the API requestor comprises:
modifying, by the one or more processors, the second response by adding alert information indicating a change to the first API request; and
transmitting, by the one or more processors, the modified second response to the API requestor as the third response.

7. The method of claim 1, further comprising:
receiving, by the one or more processors, the first API request from the API requestor;
recording, by the one or more processors, the first API request with respect to the API requestor; and
forwarding, by the one or more processors, the first API request to the API provider.

8. A system comprising:
a processing unit; and
a memory coupled to the processing unit and storing instructions thereon, the instructions, when executed by the processing unit, performing acts including:
in response to a first response from an application programming interface (API) provider indicating a failure of a first API request initiated by an API requestor, generating a second API request at least based on the first API request and a specification information from the API provider specifying a change to the first API request;
responsive to determining that the specification information specifies addition of a second field into the first API request:
determining a first value of the second field; and
including within the second API request the second field and populating the second field with the first value;
transmitting the second API request to the API provider;
receiving a second response to the second API request from the API provider; and
providing a third response to the API requestor based on the second response.

9. The system of claim 8, wherein generating the second API request comprises:
obtaining specification information from the API provider, the specification information specifying a change to the first API request.

10. The system of claim 8, wherein generating the second API request based on the first API request and the specification information comprises:
responsive to a determination that the specification information specifies deletion of a first field from the first API request, generating the second API request by deleting the first field from the first API request.

11. The system of claim 8, wherein generating the second API request based on the first API request and the specification information comprises:
responsive to a determination that the specification information specifies a modification of a third field of the first API request into a fourth field, generating the second API request by modifying the third field of the first API request into the fourth field and populating the fourth field with a second value.

12. The system of claim 8, wherein providing the third response to the API requestor based on the second response comprises:
responsive to a determination that the second response indicates success of the second API request, transmitting the second response to the API requestor as the third response; and
responsive to a determination that the second response indicates a failure of the second API request,
generating a third API request at least based on the first API request,
transmitting the third API request to the API provider,
receiving a fourth response to the third API request from the API provider, and
providing the third response to the API requestor based on the fourth response.

13. The system of claim 12, wherein transmitting the second response to the API requestor comprises:
modifying the second response by adding alert information indicating a change to the first API request; and
transmitting the modified second response to the API requestor as the third response.

14. A computer program product, the computer program product comprising a computer readable storage medium having program instructions embodied therewith, the program instructions executable by an electronic device to cause the electronic device to perform acts comprising:
in response to a first response from an application programming interface (API) provider indicating a failure of a first API request initiated by an API requestor, generating a second API request at least based on the first API request and a specification information from the API provider specifying a change to the first API request;
responsive to determining that the specification information specifies addition of a second field into the first API request:
determining a first value of the second field; and
including within the second API request the second field and populating the second field with the first value;
transmitting the second API request to the API provider;
receiving a second response to the second API request from the API provider; and
providing a third response to the API requestor based on the second response.

15. The computer program product of claim 14, wherein generating the second API request comprises:
obtaining specification information from the API provider, the specification information specifying a change to the first API request.

16. The computer program product of claim 14, wherein generating the second API request based on the first API request and the specification information comprises:

responsive to a determination that the specification information specifies deletion of a first field from the first API request, generating the second API request by deleting the first field from the first API request.

17. The computer program product of claim 14, wherein generating the second API request based on the first API request and the specification information comprises:

responsive to a determination that the specification information specifies a modification of a third field of the first API request into a fourth field, generating the second API request by modifying the third field of the first API request into the fourth field and populating the fourth field with a second value.

\* \* \* \* \*